(12) United States Patent
Wang et al.

(10) Patent No.: US 11,005,954 B2
(45) Date of Patent: May 11, 2021

(54) METHOD AND DEVICE FOR ACCESSING LOCATION RELATED INFORMATION

(71) Applicant: Tsinghua University, Beijing (CN)

(72) Inventors: Jilong Wang, Beijing (CN); Qianli Zhang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/111,584

(22) Filed: Dec. 4, 2020

(65) Prior Publication Data

US 2021/0092193 A1    Mar. 25, 2021

Related U.S. Application Data

(63) Continuation of application No. PCT/CN2018/093767, filed on Jun. 29, 2018.

(51) Int. Cl.
*H04L 29/08* (2006.01)
*G06F 16/29* (2019.01)
*H04L 12/18* (2006.01)
*H04L 29/12* (2006.01)

(52) U.S. Cl.
CPC .............. *H04L 67/18* (2013.01); *G06F 16/29* (2019.01); *H04L 12/18* (2013.01); *H04L 61/2007* (2013.01)

(58) Field of Classification Search
CPC ..... H04L 67/18; H04L 67/02; H04L 67/2838; H04L 12/18; H04L 61/2007; H04L 61/1511; G06F 16/29
See application file for complete search history.

(56) References Cited

U.S. PATENT DOCUMENTS 7,415,468 B1 *    8/2008    Hijl .................. H04L 29/12066

FOREIGN PATENT DOCUMENTS

| CN | 1365561 | 8/2002 |
|---|---|---|
| CN | 101425950 | 5/2009 |
| CN | 101425950 A * | 5/2009 |
| CN | 101513020 | 8/2009 |
| CN | 102196417 | 9/2011 |
| CN | 103139325 | 6/2013 |
| CN | 104298740 | 1/2015 |

(Continued)

OTHER PUBLICATIONS

SIPO, First Office Action for CN Application No. 201810712214.X, dated Nov. 26, 2019.

(Continued)

*Primary Examiner* — John M Macilwinen
*Assistant Examiner* — Rachel J Hackenberg
(74) *Attorney, Agent, or Firm* — Hodgson Russ LLP

(57) ABSTRACT

The present disclosure discloses a method and a device for accessing location related information. The method includes: receiving a request for assigning a network address to a POI; encoding the POI based on a preset geographical name code database to obtain a POI code of the POI; mapping the POI code into a network address, the network address comprising at least one of an IPv6 unicast address, an IPv6 multicast address, or a domain name; and sending the network address to a network device, enabling the network device to obtain location related information of the POI by accessing a site corresponding to the network address.

14 Claims, 4 Drawing Sheets

IPv6 mapped by POI

(56) References Cited

FOREIGN PATENT DOCUMENTS

| CN | 104298740 | A | * | 1/2015 |
| CN | 104320383 | | | 1/2015 |
| CN | 104320383 | A | * | 1/2015 |
| CN | 105357334 | | | 2/2016 |

OTHER PUBLICATIONS

SIPO, Second Office Action for CN Application No. 201810712214. X, dated May 29, 2020.
WIPO, ISR for PCT/CN2018/093767, Mar. 27, 2019.

* cited by examiner

IPv6 mapped by POI

| RFC 4648 Base32 alphabet | | | | | | | |
|---|---|---|---|---|---|---|---|
| value | character | value | character | value | character | value | character |
| 0 | A | 8 | I | 16 | Q | 24 | Y |
| 1 | B | 9 | J | 17 | R | 25 | Z |
| 2 | C | 10 | K | 18 | S | 26 | 2 |
| 3 | D | 11 | L | 19 | T | 27 | 3 |
| 4 | E | 12 | M | 20 | U | 28 | 4 |
| 5 | F | 13 | N | 21 | V | 29 | 5 |
| 6 | G | 14 | O | 22 | W | 30 | 6 |
| 7 | H | 15 | P | 23 | X | 31 | 7 |

US 11,005,954 B2

METHOD AND DEVICE FOR ACCESSING LOCATION RELATED INFORMATION

CROSS-REFERENCE TO RELATED APPLICATION

This application is a continuation of International Application No. PCT/CN2018/093767, with an international filing date of Jun. 29, 2018, the entire content of which is incorporated herein by reference.

FIELD

The present disclosure relates to a field of computer network technologies, and more particularly to a method and a device for accessing location related information.

BACKGROUND

Presently, a plurality of Internet devices can perform geographical location by attaching to a network device, to determine a geographical position itself. However, the Internet device in a position is still difficult to receive a specified signal for the position and is also difficult to communicate with surrounding Internet devices.

SUMMARY

A first aspect of embodiments of the present disclosure provides a method for accessing location related information, including: obtaining a point of interest POI about an electronic device; encoding the POI based on a preset geographical name code database to obtain a POI code of the POI; mapping the POI code into a network address, the network address including at least one of an IPv6 unicast address, an IPv6 multicast address, or a domain name; and sending the network address to a network device, enabling the network device to obtain location related information of the POI by accessing a site corresponding to the network address.

Another aspect of the present disclosure provides a device for accessing location related information, including: one or more processors, and a memory, configured to store one or more programs that, when executed by the one or more processors, cause the device to implement a method for accessing location related information, the method comprising: obtaining a point of interest POI about an electronic device; encoding the POI based on a preset geographical name code database to obtain a POI code of the POI; mapping the POI code into a network address, the network address including at least one of an IPv6 unicast address, an IPv6 multicast address, or a domain name; and sending the network address to a network device, enabling the network device to obtain location related information of the POI by accessing a site corresponding to the network address.

Additional aspects and advantages of embodiments of the present disclosure will be given in part in the following descriptions, and become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Description is made to a method and a device for accessing location related information below with reference to accompanying drawings. First, the method for accessing location related information is described with reference to the accompanying drawings.

The present disclosure implements to obtain related information of a POI (point of interest) by mapping the POI to an IPv6 unicast address, an IPv6 multicast address or a domain name.

Each node on the Internet distinguishes each other and associates with each other depending on an IP address, and the IP address becomes a basis of the entire Internet interconnection and identity differentiation. With the extension of the Internet scale, IPv4 addresses are occupied gradually, and next generation Internet on the basis of IPv6 is getting more and more widely used. An IPv6 address can be a unicast address or a multicast address. In traditional unicast transmission, a point-to-point network connection is implemented between a sender and a receiver.

Figure 1:
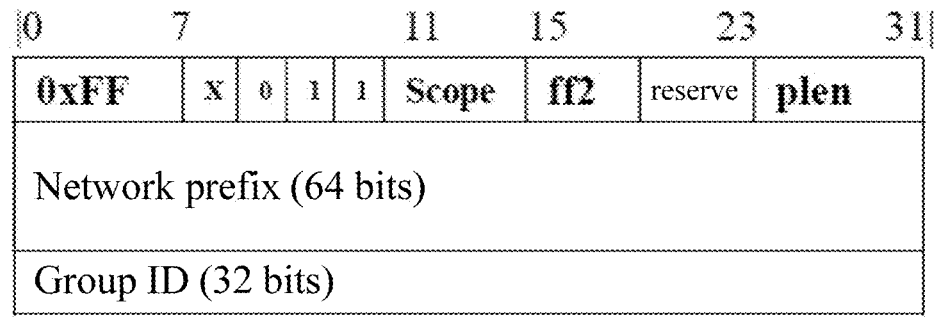
FIG. 1 is a schematic diagram illustrating a multicast address based on a unicast prefix in the related art.

There is a plurality of formats for IPv6 multicast address. A common multicast address based on a unicast prefix is illustrated in FIG. 1. As illustrated in FIG. 1, the highest 8 bits are 0xFF, indicating that the address is a multicast address. The 4 bits following the highest 8 bits are Flag bits, and the highest bit of the Flag bits is 0. The Flag bits is configured indicate attributes such as functions and generation ways of the multicast. The 4 bits following the Flag bits represent a scope of the multicast.

DNS (Domain Name System) is a core service of the Internet. DNS acts as a distributed database that may map a domain name and an IP address to each other, such that the user interviews the Internet more conveniently and does not need to remember an IP data string that can be directly read by the machine. Intuitively, a domain name of DNS is a character string connected by ".", such as www.tsinghua.edu.cn, in which, a top-level domain is the "cn" domain, a second-level domain is China education and research computer network domain "edu.cn", and a third-level domain is Tsinghua University's domain "tsinghua.edu.cn".

Figure 2:
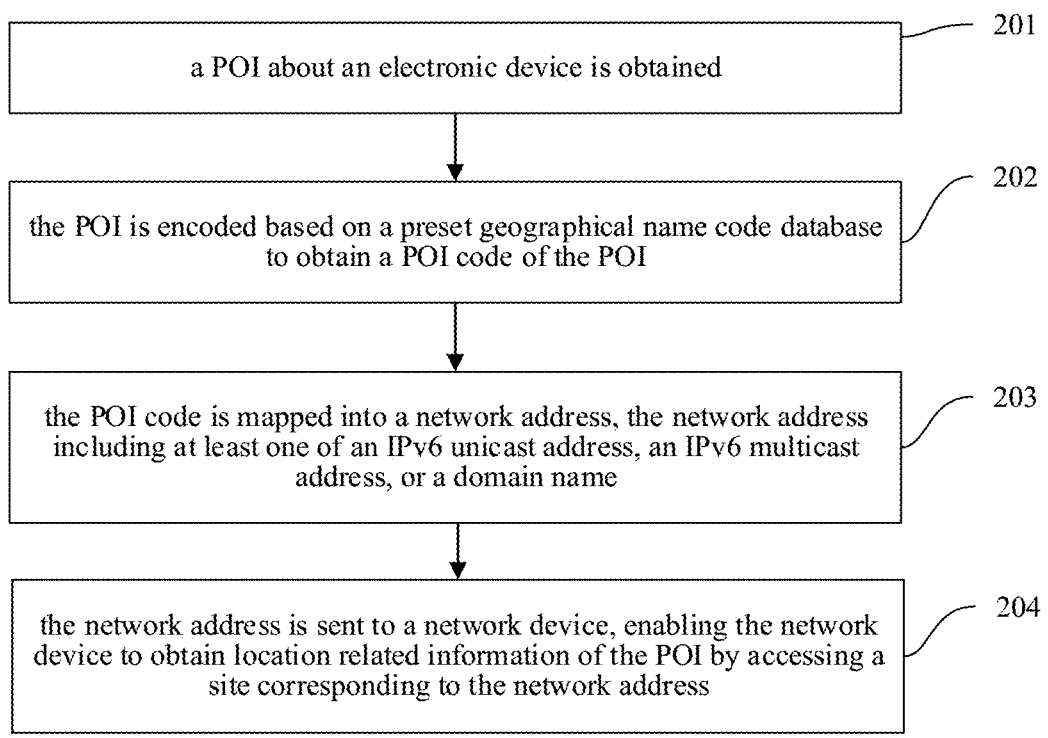
FIG. 2 is a flow chart illustrating a method for accessing location related information according to an embodiment of the present disclosure.

FIG. 2 is a flow chart illustrating a method for accessing location related information according to an embodiment of the present disclosure.

As illustrated in FIG. 2, the method for accessing location related information includes the followings.

At block 201, a POI about an electronic device is obtained.

At block 202, the POI is encoded based on a preset geographical name code database to obtain a POI code of the POI.

At block 203, the POI code is mapped into a network address, the network address including at least one of an IPv6 unicast address, an IPv6 multicast address, or a domain name; and At block 204, the network address is sent to a network device, enabling the network device to obtain location related information of the POI by accessing a site corresponding to the network address.

Figure 3:
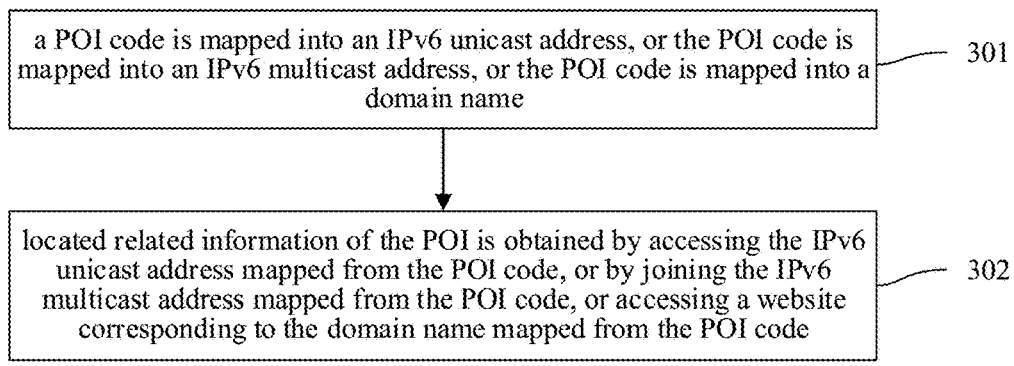
FIG. 3 is a flow chart illustrating a method for accessing location related information according to an embodiment of the present disclosure.

FIG. 3 is a flow chart illustrating a method for accessing location related information according to an embodiment of the present disclosure.

As illustrated in FIG. 3, the method for accessing location related information includes the followings.

At block 301, a POI code is mapped into an IPv6 unicast address, or the POI code is mapped into an IPv6 multicast address, or the POI code is mapped into a domain name.

In block 302, located related information of the POI is obtained by accessing the IPv6 unicast address mapped from the POI code, or by joining the IPv6 multicast address mapped from the POI code, or accessing a website corresponding to the domain name mapped from the POI code.

In detail, in an embodiment of the present disclosure, the POI is encoded to obtain the POI code. The POI code is mapped into the IPv6 unicast address, the IPv6 multicast address or a DNS domain name. When the IPv6 unicast address or the DNS domain name is input by a user, the user may access a site corresponding to the IPv6 unicast address or the DNS domain name. By accessing the site, location related information may be obtained. Alternatively, the user may receive information related to the POI or communicate with other users who join a multicast group corresponding to the IPv6 multicast address by joining the multicast group.

Figure 4:
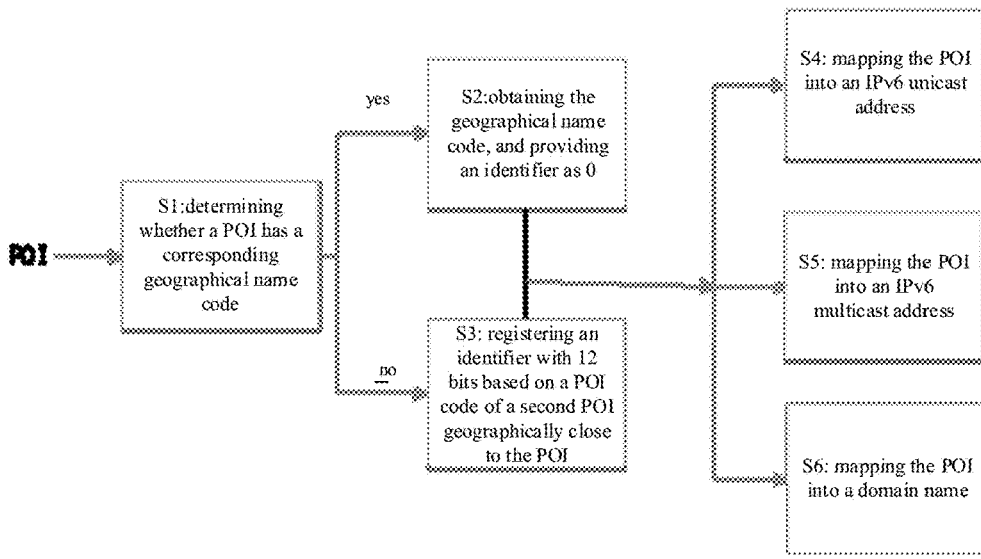
FIG. 4 is a schematic diagram illustrating a network mapping based on POI code in a method for accessing location related information according to an embodiment of the present disclosure.

FIG. 4 is a schematic diagram illustrating a network mapping based on POI code in a method for accessing location related information according to an embodiment of the present disclosure.

As illustrated in FIG. 4, mapping the POI code into the IPv6 unicast address, the IPv6 multicast address or a DNS domain name may include the followings.

At block S1, it is determined whether a POI has a corresponding geographical name code. If yes, an action at block S2 is executed, otherwise, an action at block S3 is executed.

At block S2, the geographical name code is obtained, and an identifier is provided as 0 for the geographical name code. The IPv6 unicast address mapped from the POI code may be obtained at block S4. The IPv6 multicast address mapped from the POI code may be obtained at block S5. The domain name mapped from the POI code may be obtained at block S6.

At block S3, an identifier is registered based on a POI code of a second POI geographically close to the POI. For example, the identifier may be 12 bits. The IPv6 unicast address mapped from the POI code may be obtained at block S4. The IPv6 multicast address mapped from the POI code may be obtained at block S5. The domain name mapped from the POI code may be obtained at block S6.

At block S4, the POI code is mapped into the IPv6 unicast address.

At block S5, the POI code is mapped into the IPv6 multicast address.

At block S6, the POI code is mapped into the domain name.

In detail, in an embodiment of the present disclosure, the POI generally identifies a geographical area. All the positions in the area may be taken as a part of the POI, having a wide range of user acceptance. In an embodiment of the present disclosure, taking Lee Shau Kee Building of Tsinghua University as an example, any floor and any room of the building is a part of the Lee Shau Kee Building of Tsinghua University, and mentioning Lee Shau Kee Building of Tsinghua University, the user means a set of positions in the building. A traditional method for collecting the geographical information needs a map surveyor to employ a precise surveying instrument to obtain a latitude and a longitude of a POI and to record the latitude and the longitude. Each POI contains four aspect of information, such as names, categories, coordinates and classes. Comprehensive POI information is helpful for enriching navigation maps, and timely POI information may remind users about branches of the road and detailed information about surrounding buildings, and may be further convenient for the user to find the place needed in the navigation.

It should be understood that, there is a complex relationship among POIs. For example, there is a containing relationship among POIs, such as a POI of Lee Shau Kee Building of Tsinghua University is contained in a POI of Tsinghua University. Some POI points correspond to a same position, for example, Tsinghua Park and Tsinghua University are two names of the same location. Some POIs overlap each other, for example, there is certain overlap between Huaqing Jiayuan and Wudaokou.

Further, an encode mode for implementing a country geographical name database is established officially. For example, the code of the Chinese geographical name database is formulated based on national standards in the Chinese Code<Codes for administrative divisions of the People's Republic of China>(GB2260), coding rules in the Chinese Code<Rules for administrative divisions under county code representation>(GB10114-88), <Rules for civil statistics code representation>, and the Chinese Code<Rules for classification of geographical names and code representation>(GB/T1852-2001). A code in the country geographical name database has 20 digits and is divided into four segments. Brief introduction is made below to the four segments.

A first segment consists of 6 digits, representing codes of administrative division above county level, executing<Codes for administrative divisions of the People's Republic of China>(GB/2260-2002). Administrative division digital codes (abbreviation: digital code) employ a hierarchical code structure with three levels and six bits. The three levels respectively represent respective provinces (autonomous regions, province-level municipalities, or special administrative regions), respective cities (city-level regions, autonomous prefectures, Leagues), respective counties (autonomous counties, county-level cities, Banners, autonomous Banners, municipal districts, forest districts, special zones) based on the levels. The meanings of the digital codes from left to right of the bits structure are as follows. The first level, i.e., the first two bits, represents a province, an autonomous region, a province-level municipality, or a special administrative region. The second level, i.e., the middle two bits, represents a city, a city-level region, an autonomous prefecture, a League, a summary code of districts/countries under a province-level municipality, or a summary code of county-level administrative divisions directly under a province/an autonomous region, in which, 01~20 and 51~70 represent the cities, 01 and 02 are further configured to represent the summary code of districts/countries under a province-level municipality, 21~50 represent the regions, the autonomous prefectures, or the Leagues, and 90 represents the summary code of the county-level administrative regions directly under a province-level municipality. The third level, i.e., the last two bits, represents a county, an autonomous county, a county-level city, a Banner, an autonomous Banner, a municipal district, a forest district, a special zone, in which, 01~20 represent the municipal districts, county-level cities under a region (an autonomous prefecture, a League), municipal special zones, and county-level cities in the county-level administrative division directly under a province (an autonomous region), 01 generally represents a summary code of municipal districts, 21~80 represent the counties, the autonomous counties, the Banners, the autonomous Banners, the forest districts, the special zones under a region, and 81~99 represent the county-level cities under a province.

A second segment consists of 3 digits, executing<Rules for administrative division under county code>(GB10114-2003). The first digit is a category identifier, in which, "0" represents a street, "1" represents a town, "2" and "3" represent a village, and "4" and "5" represent a government-enterprise integration unit. The second digit and the third digit represent sequence numbers of respective administrative divisions in the second segment. The second segment is divided as follows, 1. 001-099 represent codes of the streets, which may be written in an order of small to large within the scope of the region.
2. 100-199 represent codes of the towns (national towns), which may be written in the order from small to large within the scope of the region.
3. 200-399 represent codes of the villages (national villages), which may be written in the order from small to large within the scope of the region.
4. 400-599 represent codes of the government-enterprise integration units, which may be written in the order from small to large within the scope of the region.
5. 600-699 represent codes of the non-illegal units such as a development zone, which may be written in the order from small to large within the scope of the region.
6. 999 represents a code of a province, a city, or a district (county) level, which may be written within the scope of the region.

A third segment consists of 5 digits, representing an attribute category of a geographical name, executing<Rules for classification of geographical names and code representation>(GB/T 18521-2001).

A fourth segment consists of 6 digits, representing an extra-code code, with a detailed code segment 000000-999999, and configured to distinguish and sort geographical names in the same category and in the same administrative region. If the first 14 codes (including all the digits in the first, second and third segments) may determine the uniqueness of this geographical name, the fourth segment code is represented by 000000.

In an embodiment of the present disclosure, for a geographical name whose POI code having 20 bit codes, the 20 bit codes may be mapped into an IPv6 address, thus forming an IPv6 unicast address mapped from the POI code. The user may access the IPv6 unicast address to obtain information related to the POI.

In an embodiment of the present disclosure, a PO1 code is mapped to the IPv6 unicast address, thus forming the IPv6 unicast address mapped by the POI code. The user may interview this IPv6 unicast address, to obtain the related information of the POI.

Figure 5:
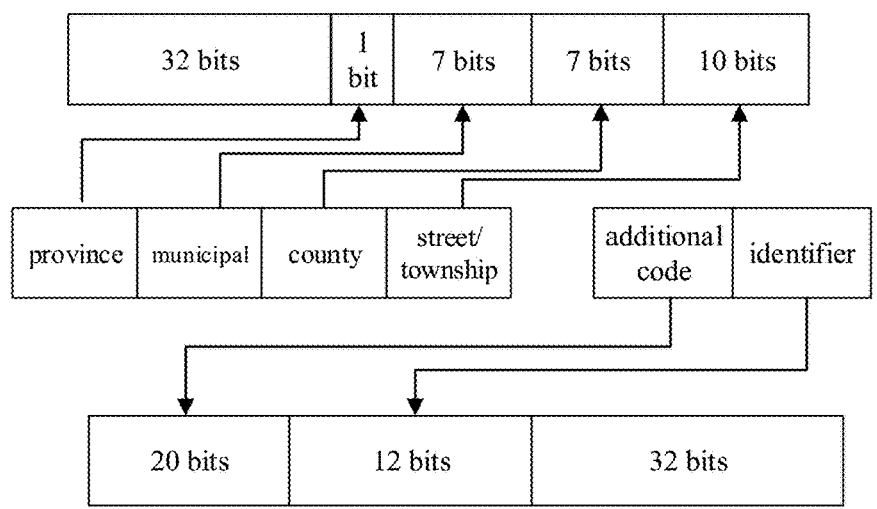
FIG. 5 is a schematic diagram illustrating a method for mapping a POI code to an IPv6 unicast address in a method for accessing location related information according to an embodiment of the present disclosure.

In an embodiment of the present disclosure, the mapping may be performed as follows. The POI code is encoded by using 51 bits of the IPv6 unicast address. A provincial-level code (a provincial administrative district part) of the POI code is encoded by using a first 7 bits of the 51 bits. A municipal-level code (a municipal administrative district part) of the POI code is encoded by using a second 7 bits of the 51 bits. A country-level code (a country-level administrative district part) of the POI code is encoded by using a third 7 bits of the 51 bits. A street/township-level code (a street/township administrative district part) of the POI code is encoded by using 10 bits of the 51 bits, and an extra-code of the POI code is encoded by using 20 bits of the 51 bits. The 51 bits are located in middle of the IPv6 unicast address, and other bits of the IPv6 unicast address behind the 51 bits are provided as 0. Thus the mapping from the POI code to the IPv6 unicast address is implemented, which is illustrated in FIG. 5.

In an embodiment of the present disclosure, when the mapping is performed by using a 32 subnet of an IPv6 address, the 33-th bit of the IPv6 address is reserved, i.e., provided as 0, a provincial level, a municipal level, a country level and a street/township level are encoded by using 31 bits following the 33-th bit, the extra-code is encoded by using the first 20 bits in the last 64 bits of the IPv6 address, and all the following 44 bits in the last 64 bits are provided to be 0.

In an embodiment of the present disclosure, when a POI does not have a geographical name code in a database, such as a geographical name database, a second POI geographically having a minimum distance from the POI is selected, and an identifier is obtained by registering. For example, an identifier of 12 bits is registered, and the identifier is encoded into a position after the extra-code in the IPv6 address.

In above embodiment of the present disclosure, the IPv6 address may refers to the IPv6 unicast address.

In an embodiment of the present disclosure, a POI coded may be mapped into an IPv6 multicast address, and the user may join a group identified by the multicast address to receive information sent by the POI.

Figure 6:
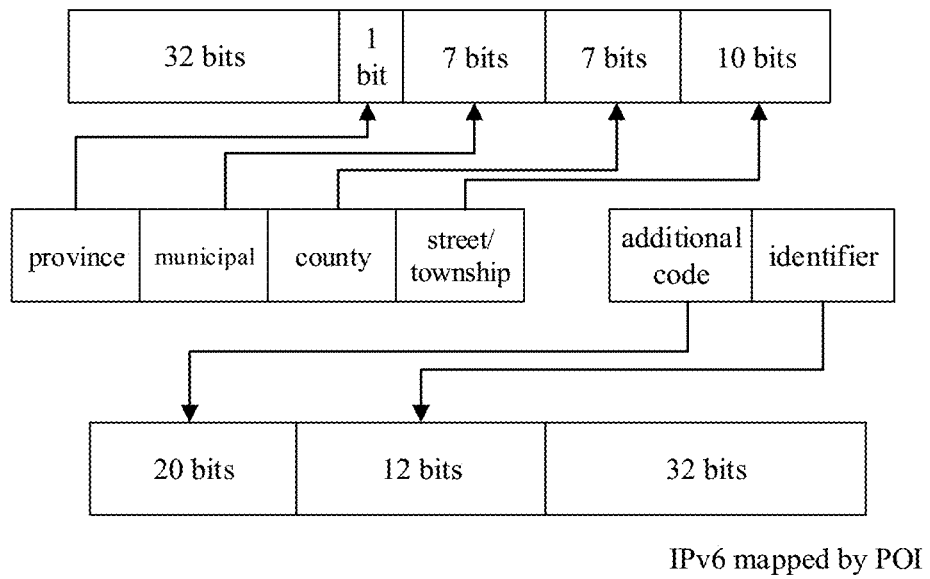
FIG. 6 is a schematic diagram illustrating a method for mapping a POI code to an IPv6 multicast address in a method for accessing location related information according to an embodiment of the present disclosure.

In an embodiment of the present disclosure, the mapping method is as follows. A 32-bit multicast prefix is selected. The 33-th bit in the IPv6 multicast address is provided as a reserved bit, i.e., provided as 0. The POI code is encoded by using 51 bits following the 33-th bit in the IPv6 multicast address. A provincial administrative district part of the POI code is encoded by using a first 7 bits of the 51 bits. A municipal administrative district part of the POI code is encoded by using a second 7 bits of the 51 bits. A county-level administrative district part of the POI code is encoded by using a third 7 bits of the 51 bits. A street/township administrative district part of the POI code is encoded by using 10 bits of the 51 bits. An extra-code part of the POI code is encoded by using 20 bits of the 51 bits. The 51 bits are located in the middle part of the IPv6 multicast address. The 12 bits following the 51 bits in the IPv6 multicast address are provided to be 0, and the last 32 bits of the IPv6 multicast address are provided to be a group ID of the IPv6 multicast address. An example is illustrated in FIG. 6.

In an embodiment of the present disclosure, when a POI does not have a geographical name code in a database, such as a geographical name database, a second POI geographically having a minimum distance from the POI is selected and an identifier is obtained by registering. For example, an identifier of 12 bits is registered, and the identifier is encoded into a position after the extra-code in the IPv6 multicast address.

In an embodiment of the present disclosure, a POI is encoded and mapped into a domain name. The user may access a site corresponding to the domain name to obtain the information related to the POI.

Figure 7:
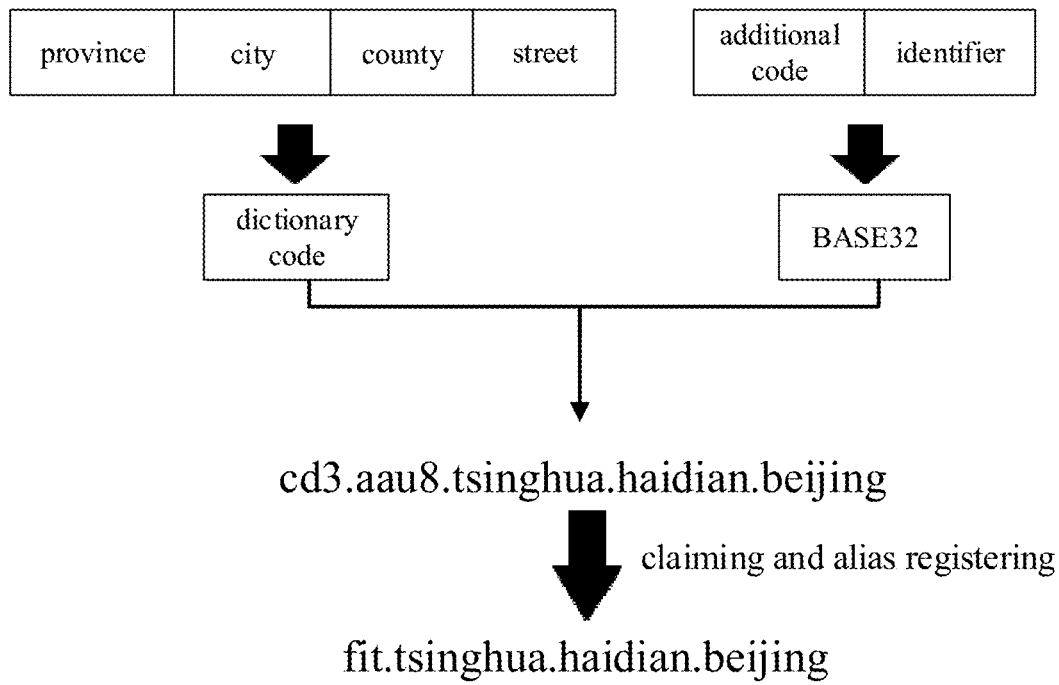
FIG. 7 is a schematic diagram illustrating a method for mapping a POI code to a domain name in a method for accessing location related information according to an embodiment of the present disclosure.

In an embodiment of the present disclosure, the mapping method is as follows. The provincial administrative district part, the municipal administrative district part, the country-level administrative district part and the street/township administrative district part is encoded based on a dictionary, and the extra-code part of the POI code is encoded by using a code-table mapping way, which is illustrated in FIG. 7.

In an embodiment of the present disclosure, the encoding process may be performed by using a BASE32 encoding way of 5 bits, such that the extra-code of 20 bits may be mapped into four alphabets. The BASE32 encoding way is illustrated as FIG. 8.

In an embodiment of the present disclosure, when a POI does not have a geographical name code in a database, such as a geographical name database, a second POI geographically having a minimum distance from the POI is selected, an extra-code of the POI is registered by registering a webpage, and then the identifier is taken as a first item of the DNS (Domain Name System) domain name.

In an embodiment of the present disclosure, the user may claim a site corresponding to the extra-code and may select an alias for the site. By selecting the alias, a more general method may be used to identify the site to which the POI corresponds. In order to distinguish with the name formed by the encoding, a length of the alias may be lower than or equal to 4 characters, or have a character that is not used in BASE32, such as 0, 1, 8, and 9.

With the method for accessing location related information, by encoding the POI, and mapping the POI code into the IPv6 unicast address, the IPv6 multicast address or the domain name, the user may access the site corresponding to address when the user inputs the IPv6 unicast address or the domain name, and the information related to the POI may be obtained by accessing the site. Alternatively, the user may receive the information related to the POI or communicate with other user joining the multicast group by joining the IPv6 multicast group obtained by encoding the POI. Thus the method has an advantage of facilitating the user to obtain the POI when accessing the site, improving the user experience.

Further, a device for accessing location related information will be described with reference to the accompanying drawings.

Figures 8, 9:
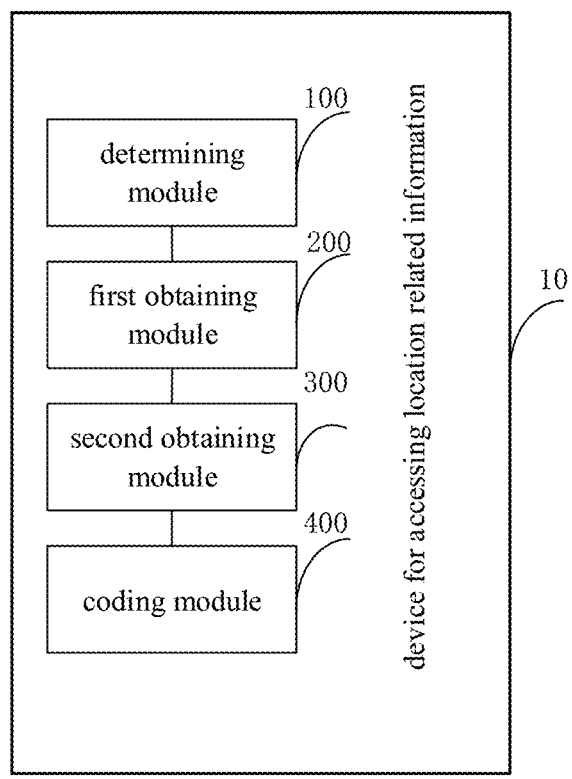
FIG. 8 is a schematic diagram illustrating a BASE32 character code in a method for accessing location related information according to an embodiment of the present disclosure.
FIG. 9 is a block diagram illustrating a device for accessing location related information according to an embodiment of the present disclosure.

FIG. 9 is a block diagram illustrating a device for accessing location related information according to an embodiment of the present disclosure.

As illustrated in FIG. 9, the device 10 for accessing location related information includes: a determining module 100, a first obtaining module 200, a second obtaining module 300 and a coding module 400.

The determining module 100 is configured to determine whether a POI has a corresponding geographical name code.

The first obtaining module 100 is configured to obtain a POI code of the POI when the POI has the geographical name code, and to provide an identifier to be 0.

The second obtaining module 300 is configured to obtain a POI code based on a second POI satisfying a preset condition when the POI does not have the geographical name code, and to obtain an identifier by registering. The identifier obtained includes an identifier with 12 bits.

The coding module 400 is configured to map the POI code into an IPv6 unicast address, to map the POI code into an IPv6 multicast address, or map the POI code into a domain name, thereby obtaining the position related information of the POI. The device 10 for accessing location related information has an advantage of facilitating the user to obtain POI when accessing the site, improving the user experience.

Further, in an embodiment of the present disclosure, the coding module 400 further includes a first mapping unit and a second mapping unit.

The first mapping unit is configured to encode the POI code by using 51 bits of the IPv6 unicast address. A provincial administrative district part is encoded by using a first 7 bits of the 51 bits. A municipal administrative district part is encoded by using a second 7 bits of the 51 bits. A country-level administrative district part is encoded by using a third 7 bits of the 51 bits. A street/township administrative district part is encoded by using 10 bits of the 51 bits.

The second mapping unit is configured to encode an extra-code part by using 20 bits of the 51 bits, and add 0 in the behind of the 51 bits. The 51 bits locates in the middle part of the IPv6 address. Thus the mapping from the POI to the IPv6 unicast address is realized.

Further, in an embodiment of the present disclosure, when the coding module 400 performs mapping by using a 32-bit subnet of the IPv6 address, the 33-th bit of the IPv6 address is reserved, and the provincial-level, the municipal-level, the country-level, the street/township-level codes are encoded by using 31 bits following the 33-th bit, the extra-code is encoded by using the first 20 bits in the last 64 bits of the IPv6 address, and all the 44 bits in the last 64 bits after the first 20 bits are provided to be 0.

In an embodiment of the present disclosure, when the coding module 400 maps the POI code into the IPv6 multicast address, the coding module 400 is configured to: select a 32-bit multicast prefix; provide a 33-th bit in the IPv6 multicast address as a reserved bit; encode the POI code by using 51 bits following the 33-th bit in the IPv6 multicast address. The 51 bits are located in middle of the IPv6 multicast address, a provincial-level code of the POI code is encoded by using a first 7 bits of the 51 bits, a municipal-level code of the POI code is encoded by using a second 7 bits of the 51 bits, a county-level code of the POI code is encoded by using a third 7 bits of the 51 bits, and a street/township-level code of the POI code is encoded by using 10 bits of the 51 bits, and an extra-code of the POI code is encoded by using last 20 bits of the 51 bits. The coding module 400 is configured to provide 12 bits following the 51 bits in the IPv6 multicast address to be 0, and to provide the last 32 bits of the IPv6 multicast address to be a group ID of the IPv6 multicast address.

In an embodiment of the present disclosure, when the coding module 400 maps the POI code into the domain name, the coding module 400 is configured to encode a provincial-level code, a municipal-level code, a country-level code, and a country-level code of the POI code based on a dictionary; and encode an extra-code of the POI code by using a code-table mapping way.

It should be noted that, the explanation for the method for accessing location related information is applicable to the device for accessing location related information, which is not elaborated herein.

With the device for accessing location related information, by encoding the POI, and mapping the POI code into the IPv6 unicast address, the IPv6 multicast address or the domain name, the user may access the site corresponding to address when the user inputs the IPv6 unicast address or the domain name, and the information related to the POI may be obtained by accessing the site. Alternatively, the user may receive the information related to the POI or communicate with other user joining the multicast group by joining the IPv6 multicast group obtained by encoding the POI. Thus the method has an advantage of facilitating the user to obtain the POI when accessing the site, improving the user experience.

The present disclosure further provide an electronic device. The electronic device includes: a memory configured to store instructions, and a processor configured to call the instructions to implement the method for accessing location related information according to above embodiments of the present disclosure.

It should be noted that, the explanation for the method for accessing location related information is applicable to the electronic device.

In addition, the terms "first" and "second" are only for description purpose, it cannot be understood as indicating or implying its related importance or implying the number of indicated technology features. Thus, features defined as "first" and "second" may explicitly or implicitly include at least one of the features. In the description of the present disclosure, "a plurality of" means at least two, such as two, three, unless specified otherwise.

In the description of the specification, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The schematic descriptions for the above terms throughout this specification are not necessarily referring to the same embodiment or example of the present disclosure. Furthermore, the particular features, structures, materials, or characteristics may be combined in any suitable manner in one or more embodiments or examples. In addition, without a contradiction, the different embodiments or examples and the features of the different embodiments or examples can be combined by those skilled in the art.

Although embodiments of the present disclosure have been shown and described above. It should be understood that, the above embodiments are exemplary, and it would be appreciated to limit the present disclosure. Those skilled in the art may make changes, alternatives, and modifications in the above embodiments without departing from scope of the present disclosure.

What is claimed is:

1. A method for accessing location related information, comprising:

obtaining a point of interest (POI) about an electronic device;

encoding the POI based on a preset geographical name code database to obtain a POI code of the POI;

mapping the POI code into a network address, the network address comprising at least one of an IPv6 unicast address, an IPv6 multicast address, or a domain name; and sending the network address to a network device, enabling the network device to obtain location related information of the POI by accessing a site corresponding to the network address;

wherein, encoding the POI based on the preset geographical name code database to obtain the POI code of the POI comprises:

determining whether the preset geographical name code database comprises a geographical name code of the POI;

in response to determining that the preset geographical name code database comprises the geographical name code of the POI, providing a preset character as an identifier of the POI code of the POI; and in response to determining that the preset geographical name code database does not comprise the geographical name code of the POI, selecting a second POI satisfying a preset condition, and providing a character different from the preset character as the identifier of the POI code of the POI;

wherein, when the network address comprises the IPv6 unicast address, mapping the POI code into the network address comprises:

encoding the POI code by using 51 bits of the IPv6 unicast address, wherein the 51 bits are located in middle of the IPv6 unicast address, a provincial-level code of the POI code is encoded by using a first 7 bits of the 51 bits, a municipal-level code of the POI code is encoded by using a second 7 bits of the 51 bits, a country-level code of the POI code is encoded by using a third 7 bits of the 51 bits, and a street/township-level code of the POI code is encoded by using 10 bits of the 51 bits, and an extra-code of the POI code is encoded by using 20 bits of the 51 bits; and adding 0 in the behind of the 51 bits, to implement the mapping from the POI code to the IPv6 unicast address;

wherein, when the mapping is performed by using a 32-bit subnet of the IPv6 unicast address, encoding the POI code by using 51 bits of the IPv6 unicast address comprises:

reserving a 33-th bit of the IPv6 unicast address;

encoding the provincial-level, the municipal-level, a county-level and a street/township-level codes by using 31 bits following the 33-th bit;

encoding the extra-code by using first 20 bits in last 64 bits of the IPv6 unicast address; and encoding 44 bits following the first 20 bits in the last 64 bits as 0.

2. The method according to claim 1, wherein the preset condition comprises:

the second POI having a minimum distance from the POI, and the second POI having a second geographical name code contained in the preset geographical name code database.

3. The method according to claim 1, wherein, the method further comprises:

encoding the identifier of the POI code to a position after the extra-code in the IPv6 unicast address.

4. The method according to claim 1, wherein, when the network address comprises the IPv6 multicast address, mapping the POI code into the network address comprises:

selecting a 32-bit multicast prefix;

providing a 33-th bit in the IPv6 multicast address as a reserved bit;

encoding the POI code by using 51 bits following the 33-th bit in the IPv6 multicast address, wherein the 51 bits are located in middle of the IPv6 multicast address, a provincial-level code of the POI code is encoded by using a first 7 bits of the 51 bits, a municipal-level code of the POI code is encoded by using a second 7 bits of the 51 bits, a county-level code of the POI code is encoded by using a third 7 bits of the 51 bits, and a street/township-level code of the POI code is encoded by using 10 bits of the 51 bits, and an extra-code of the POI code is encoded by using last 20 bits of the 51 bits; and providing 12 bits following the 51 bits in the IPv6 multicast address to be 0, and providing the last 32 bits of the IPv6 multicast address to be a group ID of the IPv6 multicast address.

5. The method according to claim 4, wherein, the method further comprises:

encoding the identifier of the POI code to a position after the extra-code in the IPv6 multicast address.

6. The method according to claim 1, wherein, when the network address comprises the domain name, mapping the POI code into the domain name comprises:

encoding a provincial-level code, a municipal-level code, a country-level code, and a country-level code of the POI code based on a dictionary; and encoding an extra-code of the POI code by using a code-table mapping way.

7. The method according to claim 6, wherein, the method further comprises:

encoding the identifier of the POI code as a first item of the domain name.

8. A device for accessing location related information, comprising:

one or more processors, and a memory, configured to store one or more programs that, when executed by the one or more processors, cause the device to implement a method for accessing location related information, the method comprising:

obtaining a point of interest (POI) about an electronic device;

encoding the POI based on a preset geographical name code database to obtain a POI code of the POI;

mapping the POI code into a network address, the network address comprising at least one of an IPv6 unicast address, an IPv6 multicast address, or a domain name; and sending the network address to a network device, enabling the network device to obtain location related information of the POI by accessing a site corresponding to the network address;

wherein, encoding the POI based on the preset geographical name code database to obtain the POI code of the POI comprises:

determining whether the preset geographical name code database comprises a geographical name code of the POI;

in response to determining that the preset geographical name code database comprises the geographical name code of the POI, providing a preset character as an identifier of the POI code of the POI; and in response to determining that the preset geographical name code database does not comprise the geographical name code of the POI, selecting a second POI satisfying a preset condition, and providing a character different from the preset character as the identifier of the POI code of the POI;

wherein, the network address comprises the IPv6 unicast address, mapping the POI code into the network address comprises:

encoding the POI code by using 51 bits of the IPv6 unicast address, wherein the 51 bits are located in middle of the IPv6 unicast address, a provincial-level code of the POI code is encoded by using a first 7 bits of the 51 bits, a municipal-level code of the POI code is encoded by using a second 7 bits of the 51 bits, a country-level code of the POI code is encoded by using a third 7 bits of the 51 bits, and a street/township-level code of the POI code is encoded by using 10 bits of the 51 bits, and an extra-code of the POI code is encoded by using 20 bits of the 51 bits; and adding 0 in the behind of the 51 bits, to implement the mapping from the POI code to the IPv6 unicast address;

wherein, when the mapping is performed by using a 32-bit subnet of the IPv6 unicast address, encoding the POI code by using 51 bits of the IPv6 unicast address comprises:

reserving a 33-th bit of the IPv6 unicast address;

encoding the provincial-level, the municipal-level, a county-level and a street/township-level codes by using 31 bits following the 33-th bit;

encoding the extra-code by using first 20 bits in last 64 bits of the IPv6 unicast address; and encoding 44 bits following the first 20 bits in the last 64 bits as 0.

9. The device according to claim 8, wherein the preset condition comprises:

the second POI having a minimum distance from the POI, and the second POI having a second geographical name code contained in the preset geographical name code database.

10. The device according to claim 8, wherein, the method further comprises:

encoding the identifier of the POI code to a position after the extra-code in the IPv6 unicast address.

11. The device according to claim 8, wherein, when the network address comprises the IPv6 multicast address, mapping the POI code into the network address further comprises:

selecting a 32-bit multicast prefix;

providing a 33-th bit in the IPv6 multicast address as a reserved bit;

encoding the POI code by using 51 bits following the 33-th bit in the IPv6 multicast address, wherein a provincial-level code of the POI code is encoded by using a first 7 bits of the 51 bits, a municipal-level code of the POI code is encoded by using a second 7 bits of the 51 bits, a county-level code of the POI code is encoded by using a third 7 bits of the 51 bits, and a street/township-level code of the POI code is encoded by using 10 bits of the 51 bits, and an extra-code of the POI code is encoded by using last 20 bits of the 51 bits; and providing 12 bits following the 51 bits in the IPv6 multicast address to be 0, and providing the last 32 bits of the IPv6 multicast address to be a group ID of the IPv6 multicast address.

12. The device according to claim 11, wherein, the method further comprises:

encoding the identifier of the POI code to a position after the extra-code in the IPv6 multicast address.

13. The device according to claim 8, wherein, when the network address comprises the domain name, mapping the POI code into the domain name comprises:
  encoding a provincial-level code, a municipal-level code, a country-level code, and a country-level code of the POI code based on a dictionary; and
  encoding an extra-code of the POI code by using a code-table mapping way.

14. The device according to claim 13, wherein, the method further comprises:
  encoding the identifier of the POI code as a first item of the domain name.

* * * * *